US012062080B2

(12) United States Patent
Shi et al.

(10) Patent No.: US 12,062,080 B2
(45) Date of Patent: Aug. 13, 2024

(54) REDUCING SAMPLE SELECTION BIAS IN A MACHINE LEARNING-BASED RECOMMENDER SYSTEM

(71) Applicant: Rakuten Group, Inc., Tokyo (JP)

(72) Inventors: Yang Shi, San Mateo, CA (US); Young-joo Chung, San Mateo, CA (US)

(73) Assignee: Rakuten Group, Inc., Tokyo (JP)

( * ) Notice: Subject to any disclaimer, the term of this patent is extended or adjusted under 35 U.S.C. 154(b) by 235 days.

(21) Appl. No.: 17/554,640

(22) Filed: Dec. 17, 2021

(65) Prior Publication Data

US 2023/0045107 A1    Feb. 9, 2023

Related U.S. Application Data

(60) Provisional application No. 63/221,872, filed on Jul. 14, 2021.

(51) Int. Cl.
*G06Q 30/0601* (2023.01)
*G06N 20/00* (2019.01)
*G06Q 30/0202* (2023.01)

(52) U.S. Cl.
CPC ......... *G06Q 30/0631* (2013.01); *G06N 20/00* (2019.01); *G06Q 30/0202* (2013.01)

(58) Field of Classification Search
CPC . G06Q 30/0631; G06Q 30/0202; G06N 20/00
See application file for complete search history.

(56) References Cited

U.S. PATENT DOCUMENTS

| 10,354,184 B1 | 7/2019 | Vitaladevuni et al. |
| 10,614,381 B2 | 4/2020 | Hoffman et al. |

(Continued)

FOREIGN PATENT DOCUMENTS

| CN | 110019652 | 7/2019 |
| CN | 110309331 | 10/2019 |

OTHER PUBLICATIONS

Kanagala "Product Recommendation system using machine learning techniques", California State University San Marcos. Dec. 10, 2020. (Year: 2020).*

(Continued)

*Primary Examiner* — Pan G Choy
(74) *Attorney, Agent, or Firm* — Lessani Law Group, PC

(57) ABSTRACT

The present disclosure relates to improving recommendations for small shops on an ecommerce platform while maintaining accuracy for larger shops by retraining a machine-learning recommendation model to reduce sample selection bias using a meta-learning process. The retraining process comprises identifying a sample subset of shops on the ecommerce platform, and then creating shop-specific versions of the recommendation model for each of the shops in the subset by optimizing the baseline model to predict user-item interactions in a first training dataset for the applicable shop. Each of the shop-specific models is then tested using a second training dataset for the shop. A loss is calculated for each shop-specific model based on the model's predicted user-item interactions and the actual user-item interactions in the second training dataset for the shop. A global loss is calculated based on each of the shop-specific losses, and the baseline model is updated to minimize the global loss.

20 Claims, 5 Drawing Sheets

(56) References Cited

U.S. PATENT DOCUMENTS

| | | | |
|---|---|---|---|
| 10,698,967 | B2 | 6/2020 | Shen et al. |
| 10,769,524 | B1 | 9/2020 | Natesh |
| 11,004,135 | B1* | 5/2021 | Sandler .............. G06Q 30/0631 |
| 11,361,365 | B2 | 6/2022 | Greenwald |
| 11,651,037 | B2 | 5/2023 | Shi et al. |
| 11,669,759 | B2* | 6/2023 | Horowitz ................ G06F 17/16 706/52 |
| 2009/0281923 | A1* | 11/2009 | Selinger ................ G06Q 30/02 705/26.1 |
| 2014/0104495 | A1* | 4/2014 | Preston .............. H04N 21/4828 348/570 |
| 2015/0154229 | A1 | 6/2015 | An et al. |
| 2017/0185894 | A1 | 6/2017 | Volkovs et al. |
| 2019/0034875 | A1* | 1/2019 | Bryan ................ G06Q 10/0875 |
| 2020/0004835 | A1 | 1/2020 | Ramanath et al. |
| 2020/0004886 | A1 | 1/2020 | Ramanath et al. |
| 2020/0005134 | A1 | 1/2020 | Ramanath et al. |
| 2020/0005149 | A1 | 1/2020 | Ramanath et al. |
| 2020/0175022 | A1 | 6/2020 | Nowozin |
| 2020/0380027 | A1 | 12/2020 | Aggarwal et al. |
| 2021/0004437 | A1 | 1/2021 | Zhang et al. |
| 2021/0012150 | A1 | 1/2021 | Liu et al. |
| 2021/0081462 | A1 | 3/2021 | Lu et al. |
| 2021/0097400 | A1 | 4/2021 | Lee |
| 2021/0110306 | A1 | 4/2021 | Krishnan et al. |
| 2021/0117839 | A1 | 4/2021 | Kulkarni et al. |
| 2021/0133846 | A1 | 5/2021 | Xu et al. |
| 2021/0150337 | A1 | 5/2021 | Raziperchikolaei |
| 2021/0191990 | A1 | 6/2021 | Shi et al. |
| 2021/0383254 | A1 | 12/2021 | Renders et al. |
| 2022/0114643 | A1 | 4/2022 | Raziperchikolaei |
| 2022/0207073 | A1 | 6/2022 | Sohail et al. |
| 2022/0277741 | A1* | 9/2022 | Chaudhary ............ G06N 20/10 |
| 2022/0300804 | A1 | 9/2022 | Guan et al. |
| 2022/0414531 | A1* | 12/2022 | Ong ........................ G06N 20/00 |

OTHER PUBLICATIONS

Hooda et al., "Social Commerce Hybrid Product Recommender", International Journal of Computer Applications (0975-8887) vol. 100—No. 12, Aug. 2014. (Year: 2014).*

Antoniou, Antreas et al., "How To Train Your MAML", ICLR 2019.

Bansal, Trapit et al., "Learning to Few-Shot Learn Across Diverse Natural Language Classification Tasks", Proceedings of the 28th International Conference on Computational Linguistics, Dec. 2020, pp. 5108-5123.

Barkan, Oren et al. "CB2CF: A Neural Multiview Content-to-Collaborative Filtering Model for Completely Cold Item Recommendations", Proceedings of the 13th ACM Conference on Recommender Systems, 2019, pp. 1-9.

Blei, David M. et al. "Latent Dirichlet Allocation", Journal of Machine Learning Research, 2003, pp. 993-1022.

Cai, Qi et al., "Memory Matching Networks for One-Shot Image Recognition", Proceedings of the IEEE Conference on Computer Vision and Pattern Recognition, 2018, pp. 4080-4088.

Chen, Minmin et al. "Marginalized Denoising Autoencoders for Domain Adaptation", Proceedings of the 29th International Conference on Machine Learning, 2012.

Chen, Zhihong et al. "ESAM: Discriminative Domain Adaptation with Non-Displayed Items to Improve Long-Tail Performance", Proceedings of the 43rd International ACM SIGIR Conference on Research and Development in Information Retrieval, 2020, pp. 579-588.

Cheng et al., "Wide & Deep Learning for Recommender Systems", DLRS '16, Sep. 15, 2016, pp. 1-4.

Chopra, Sumit et al., "Learning a Similarity Metric Discriminatively, with Application to Face Verification", 2005 IEEE Computer Society Conference on Computer Vision and Pattern Recognition (CVPR'05), vol. 1. IEEE, 2005.

Dong, Xin et al. "A Hybrid Collaborative Filtering Model with Deep Structure for Recommender Systems", Proceedings of the Thirty-First AAAI Conference on Artificial Intelligence, 2017, vol. 31, No. 1, pp. 1309-1315.

Dong, Manqing et al, "MAMO: Memory-Augmented Meta-Optimization for Cold-Start Recommendation", Proceedings of the 26th ACM SIGKDD International Conference on Knowledge Discovery & Data Mining, 2020.

Du, Zhengxiao et al. "Sequential Scenario-Specific Meta Learner for Online Recommendation", Proceedings of the 25th ACM SIGKDD International Conference on Knowledge Discovery & Data Mining, 2019, pp. 2895-2904.

Finn, Chelsea et al. "Model-Agnostic Meta-Learning for Fast Adaptation of Deep Networks", Proceedings of the 34th International Conference on Machine Learning, vol. 70, 2017, pp. 1126-1135.

Gao, Chen et al. "Cross-domain Recommendation Without Sharing User-relevant Data", The World Wide Web Conference, 2019, pp. 491-502.

Gopalan, Prem et al., "Scalable Recommendation with Hierarchical Poisson Factorization", UAI, 2015.

He, Xiangnan et al. "Neural Collaborative Filtering", Proceedings of the 26th International Conference on World Wide Web, 2017.

Krishnan, Adit et al., "An Adversarial Approach to Improve Long-Tail Performance in Neural Collaborative Filtering", Proceedings of the 27th ACM International Conference on Information and Knowledge Management, 2018, pp. 1491-1494.

Lee, Hoyeop et al. "MeLU: Meta-Learned User Preference Estimator for Cold-Start Recommendation", Proceedings of the 25th ACM SIGKDD International Conference on Knowledge Discovery & Data Mining, 2019, pp. 1073-1082.

Li, Sheng et al. "Deep Collaborative Filtering via Marginalized Denoising Auto-encoder", Proceedings of the 24th ACM International Conference on Information and Knowledge Management, 2015, pp. 811-820.

Li, Tianyu et al. "Deep Heterogeneous Autoencoders for Collaborative Filtering", 2018 IEEE International Conference on Data Mining (ICDM), IEEE, 2018.

Linden, Greg et al., "Amazon.com Recommendations: Item-to-Item Collaborative Filtering", IEEE Internet Computing, 2003, pp. 76-80.

Liu, Yudan et al. "Real-time Attention Based Look-alike Model for Recommender System", Proceedings of the 25th ACM SIGKDD International Conference on Knowledge Discovery & Data Mining, 2019.

Luo, Mi et al., "Metaselector: Meta-Learning for Recommendation with User-Level Adaptive Model Selection", Proceedings of The Web Conference, 2020, pp. 2507-2513.

Mooney, Raymond J., et al. "Content-Based Book Recommending Using Learning for Text Categorization", Proceedings of the Fifth ACM conference on Digital Libraries, 2000.

Pan, Feiyang et al., "Warm Up Cold-start Advertisements: Improving CTR Predictions via Learning to Learn ID Embeddings", Proceedings of the 42nd International ACM SIGIR Conference on Research and Development in Information Retrieval, 2019.

Raziperchikolaei, Ramin et al., "Shared Neural Item Representations for Completely Cold Start Problem", Fifteenth ACM Conference on Recommender Systems, 2021, pp. 422-431.

Shi, Shaoyun et al. "Attention-based Adaptive Model to Unify Warm and Cold Starts Recommendation", Proceedings of the 27th ACM International Conference on Information and Knowledge Management, 2018, pp. 127-136.

Slack, Dylan et al., "Fairness Warnings and Fair-MAML: Learning Fairly with Minimal Data", Proceedings of the 2020 Conference on Fairness, Accountability, and Transparency, 2020, pp. 200-209.

Van den Oord, Aaron et al. "Deep content-based music recommendation", Advances in Neural Information Processing Systems 26 (2013), pp. 1-9.

Vartak, Manasi et al. "A Meta-Learning Perspective on Cold-Start Recommendations for Items", Advances in Neural Information Processing Systems, 2017.

Vilalta, Ricardo et al., "A Perspective View and Survey of Meta-Learning", Artificial Intelligence Review, Sep. 2001, pp. 77-95.

Vincent, Pascal et al. "Stacked Denoising Autoencoders: Learning Useful Representations in a Deep Network with a Local Denoising Criterion", Journal of Machine Learning Research, 2010, pp. 3371-3408.

(56) References Cited

OTHER PUBLICATIONS

Volkovs, Maksims et al. "Dropoutnet: Addressing Cold Start in Recommender Systems", Advances in Neural Information Processing Systems, 2017, pp. 1-10.
Wang, Hao et al. "Collaborative Deep Learning for Recommender Systems", Proceedings of the 21th ACM SIGKDD International Conference on Knowledge Discovery and Data Mining, 2015, pp. 1235-1244.
Wang, Chong et al. "Collaborative Topic Modeling for Recommending Scientific Articles", Proceedings of the 17th ACM SIGKDD International Conference on Knowledge Discovery and Data Mining, 2011.
Yin, Wenpeng "Meta-learning for Few-shot Natural Language Processing: A Survey", Jul. 2020.
Yuan, Bowen et al. "Improving Ad Click Prediction by Considering Non-displayed Events", Proceedings of the 28th ACM International Conference on Information and Knowledge Management, 2019.
Zhang, Shuai et al., "Autosvd++: An Efficient Hybrid Collaborative Filtering Model via Contractive Auto-encoders", Proceedings of the 40th International ACM SIGIR Conference on Research and Development in Information Retrieval, 2017, pp. 957-960.
Zhang, Yin et al. "A Model of Two Tales: Dual Transfer Learning Framework for Improved Long-tail Item Recommendation", Proceedings of the Web Conference 2021, pp. 2220-2231.
Zhang, Yang et al., "How to Retrain Recommender System? A Sequential Meta-Learning Method", Proceedings of the 43rd International ACM SIGIR Conference on Research and Development in Information Retrieval, 2020, pp. 1479-1488.
Zhu, Yongchun et al. "Learning to Warm Up Cold Item Embeddings for Cold-Start Recommendation with Meta Scaling and Shifting Networks", Proceedings of the 44th International ACM SIGIR Conference on Research and Development In Information Retrieval, 2021, pp. 1167-1176.
Gharibshah, Zhabiz et al., "User Response Prediction in Online Advertising", ACM Comput. Surv., vol. 37, No. 4, Article 111, Aug. 2021, pp. 1-49.
Ma, Yifei et al., "Temporal-Contextual Recommendation in Real-Time", KDD '20, Aug. 23-27, 2020, pp. 2291-2299.
Bianchi, Federico et al., "Fantastic Embeddings and How to Align Them: Zero-Shot Inference in a Multi-Shop Scenario", SIGIR eCOM '20, Jul. 30, 2020, pp. 1-11.
Agarwal, Pankaj et al., "Personalizing Similar Product Recommendations in Fashion E-commerce", Jun. 29, 2018, 5 pages.
Bhaskar, Karthik Raja Kalaiselvi et al., "Implicit Feedback Deep Collaborative Filtering Product Recommendation System", Sep. 8, 2020, 10 pages.
Bronstein et al., "Data Fusion through Cross-modality Metric Learning using Similarity-Sensitive Hashing", 2010, pp. 1-8.
Cao et al., "Collective Deep Quantization for Efficient Cross-Modal Retrieval", Proceedings of the Thirty-First AAAI Conference on Artificial Intelligence, 2017, pp. 3974-3980.
Cao et al., "Deep Visual-Semantic Hashing for Cross-Modal Retrieval", KDD '16: Proceedings of the 22nd ACM SIGKDD International Conference on Knowledge Discovery and Data Mining, Aug. 2016, pp. 1445-1454.
Cao et al., "Correlation Hashing Network for Efficient Cross-Modal Retrieval", 2016, pp. 1-12.
Chen, Jingyuan, et al. "Attentive Collaborative Filtering: Multimedia Recommendation with Item-and Component-Level Attention", Proceedings of the 40th International ACM SIGIR Conference on Research and Development in Information Retrieval, 2017, 10 pages.
Deng et al., "DeepCF: A Unified Framework of Representation Learning and Matching Function Learning in Recommender System", 2019, pp. 1-9.
Ding et al., "Collective Matrix Factorization Hashing for Multimodal Data", 2014, pp. 4321-4328.
Dong et al., "A Hybrid Collaborative Filtering Model with Deep Structure for Recommender Systems", Proceedings of the Thirty-First AAAI Conference on Artificial Intelligence, 2017, pp. 1309-1315.
Gong et al., "Learning Binary Codes for High-Dimensional Data Using Bilinear Projections", 2013, pp. 484-491.
Guo et al., "DeepFM: A Factorization-Machine based Neural Network for CTR Prediction", Proceedings of the Twenty-Sixth International Joint Conference on Artificial Intelligence, 2017, pp. 1725-1731.
He, et al., "Neural Collaborative Filtering" Proceedings of the 26th International Conference on World Wide Web (WWW '17) [online], Apr. 3, 2017, pp. 173-182.
He et al., "Neural Factorization Machines for Sparse Predictive Analytics", SIGIR '17, Aug. 7-11, 2017, pp. 355-364.
He et al., "Outer Product-based Neural Collaborative Filtering", Proceedings of the Twenty-Seventh International Joint Conference on Artificial Intelligence 2018, pp. 2227-2233.
He, Xiangnan, et al. "NAIS: Neural Attentive Item Similarity Model for Recommendation", IEEE Transactions on Knowledge and Data Engineering, 2018, 13 pages.
Jiang et al., "Deep Cross-Modal Hashing", 2017, pp. 3232-3240.
Koren, "Factorization Meets the Neighborhood: a Multifaceted Collaborative Filtering Model", KDD 2008, Aug. 24-27, 2008, pp. 426-434.
Koren, Yehuda, et al. "Matrix Factorization Techniques for Recommender Systems", Computer, Published by IEEE Computer Society, 2009, pp. 42-49.
Kumar et al., "Learning Hash Functions for Cross-View Similarity Search", 2011, pp. 1-6.
Li et al., "Deep Binary Reconstruction for Cross-modal Hashing", MM '17, Oct. 23-27, 2017, pp. 1-8.
Li et al., "Deep Collaborative Filtering via Marginalized Denoising Auto-encoder", CIKM '15, Oct. 19-23, 2015, pp. 811-820.
Li et al., "Coupled Cycle-GAN: Unsupervised Hashing Network for Cross-Modal Retrieval", Thirty-Third AAAI Conference on Artificial Intelligence, 2019, pp. 176-183.
Li et al., "Deep Heterogeneous Autoencoders for Collaborative Filtering", 2018, pp. 1-6.
Li et al., "Self-Supervised Adversarial Hashing Networks for Cross-Modal Retrieval", 2018, pp. 4242-4251.
Lian et al., "xDeepFM: Combining Explicit and Implicit Feature Interactions for Recommender Systems", KDD 2018, Aug. 19-23, 2018, pp. 1-10.
Liu et al., "Recommender Systems with Heterogeneous Side Information", WWW '19, May 13-17, 2019, pp. 1-7.
Long et al., "Composite Correlation Quantization for Efficient Multimodal Retrieval", SIGIR '16, Jul. 17-21, 2016, pp. 1-11.
Nahta, Ravi et al., "Embedding metadata using deep collaborative filtering to address the cold start problem for the rating prediction task", Multimedia Tools and Applications, vol. 80, No. 12, Feb. 18, 2021, pp. 18553-18581.
Raziperchikolaei, Ramin, et al. "Neural Representations in Hybrid Recommender Systems: Prediction versus Regularization", Proceedings of the 44th International ACM SIGIR Conference on Research and Development in Information Retrieval, 2021, pp. 1743-1747.
Ricci et al., "Recommender Systems Handbook", 2011, 845 pages.
Salakhutdinov, Russ, et al. "Probabilistic Matrix Factorization", Advances in Neural Information Processing Systems, 2007, pp. 1-8.
Sedhain et al, "AutoRec: Autoencoders Meet Collaborative Filtering", WWW 2015 Companion, May 18-22, 2015, pp. 1-2.
Strub et al., "Hybrid Recommender System based on Autoencoders", Workshop on Deep Learning for Recommender Systems, Sep. 2016, pp. 1-7.
Su et al., "Deep Joint-Semantics Reconstructing Hashing for Large-Scale Unsupervised Cross-Modal Retrieval", 2019, pp. 3027-3035.
Takács, Gábor, et al. "Matrix Factorization and Neighbor Based Algorithms for the Netflix Prize Problem", Proceedings of the 2008 ACM Conference on Recommender Systems, 2008, pp. 267-274.
Wan et al., "Discriminative Latent Semantic Regression for Cross-Modal Hashing of Multimedia Retrieval", 2018 IEEE Fourth International Conference on Multimedia Big Data (BigMM), Oct. 21, 2018, pp. 1-7.

(56) References Cited

OTHER PUBLICATIONS

Wang et al., "Collaborative Deep Learning for Recommender Systems", KDD '15, Aug. 10-13, 2015, pp. 1235-1244.

Wang et al., "Effective Multi-Modal Retrieval based on Stacked Auto-Encoders", Proceedings of the VLDB Endowment, Sep. 1-5, 2014, pp. 649-660.

Wang, Huiwei et al., "ML2E: Meta-Learning Embedding Ensemble for Cold-Start Recommendation", IEEE Access, Sep. 2020, pp. 165757-165768.

Wu et al., "Quantized Correlation Hashing for Fast Cross-Modal Search", Proceedings of the Twenty-Fourth International Joint Conference on Artificial Intelligence, 2015, pp. 3946-3952.

Wu et al., "Unsupervised Deep Hashing via Binary Latent Factor Models for Large-scale Cross-modal Retrieval", Proceedings of the Twenty-Seventh International Joint Conference on Artificial Intelligence, 2018, p. 2854-2860.

Xue, Hong-Jian, et al. "Deep Matrix Factorization Models for Recommender Systems", Proceedings of the Twenty-Sixth International Joint Conference on Artificial Intelligence, vol. 17, 2017, pp. 3203-3209.

Yang et al., "Shared Predictive Cross-Modal Deep Quantization", IEEE Transactions on Neural Networks and Learning Systems, vol. 29, No. 11, Nov. 2018, pp. 5292-5303.

Yu, Runsheng et al., "Personalized Adaptive Meta Learning for Cold-Start User Preference Prediction", 35th AAAI Conference on Artificial Intelligence, Feb. 2021, pp. 10772-10780.

Zhang et al., "AutoSVD++: An Efficient Hybrid Collaborative Filtering Model via Contractive Auto-encoders", SIGIR '17, Aug. 7-11, 2017, pp. 957-960.

Zhang et al., "Collaborative Quantization for Cross-Modal Similarity Search", 2019, pp. 1-10.

Zhang et al., "Large-Scale Multimodal Hashing with Semantic Correlation Maximization", Association for the Advancement of Artificial Intelligence, 2014, pp. 1-7.

Zhang, Yongfeng, et al. "Joint Representation Learning for Top-N Recommendation with Heterogeneous Information Sources", Proceedings of the 2017 ACM Conference on Information and Knowledge Management, 2017, pp. 1-10.

\* cited by examiner

PREDICTION PHASE EMBODIMENTS

EXAMPLE MODEL ARCHITECTURES

EXAMPLE SYSTEM ARCHITECTURE

REDUCING SAMPLE SELECTION BIAS IN A MACHINE LEARNING-BASED RECOMMENDER SYSTEM

RELATED APPLICATIONS

This application claims the benefit of U.S. Provisional Application No. 63/221,872 filed on Jul. 14, 2021, and titled "Improving Cold-Start Item Advertisement for Small Businesses," the contents of which are incorporated by reference herein as if fully disclosed herein.

BACKGROUND OF THE INVENTION

1. Field of the Invention

This disclosure relates generally to machine learning-based recommender systems and, more specifically, to an improved recommender system with less sample selection bias and better performance for small shops on an ecommerce platform.

2. Description of the Background Art

A recommender system may be used to identify the users most likely to purchase an item for purposes of targeted advertising. It also may be used to recommend items to users. With the explosive growth of e-commerce in the past few decades, there are more product offerings than consumers can process, and recommender systems have become imperative to overcome this overload problem. The goal of recommender systems is to take known user feedback and predict unknown user feedback on items, which can be helpful in targeting advertisements for a product or for providing a list of suggested items to a user. The feedback, often referred to as the interaction, can be implicit (e.g., purchased/likely to purchase) or explicit (e.g., a rating between 1 and 5).

Many recommender systems use machine learning models to make predictions. For example, neural collaborative filtering (NCF) systems apply neural network encoders to user and item data to generate representations of the user and item data, and then use the user and item representations to predict user ratings for the items.

The machine learning models used to make predictions for an ecommerce platform are typically trained based on user-items interactions in the ecommerce platform. There is significantly more training data for shops with large sales volumes on the platform than for small shops. As a result, these models are better at making predictions for large shops than for small shops. This is what is known as sample selection bias. In fact, the performance of such models with respect to a new item for a small shop can be poor.

Advertising a new item with little or no sales history is referred to as cold-start item advertisement. There is demand for a recommender system with improved performance for cold start recommendations for small shops on an ecommerce platform.

SUMMARY OF THE DISCLOSURE

The present disclosure relates to improving recommendations for small shops on an ecommerce platform while maintaining accuracy for larger shops. The improvement is achieved by retraining a machine-learning recommendation model to reduce sample selection bias using a meta-learning process. The retraining process comprises identifying a sample subset of shops on the ecommerce platform, and then creating shop-specific versions of the recommendation model for each of the shops in the subset. Each shop-specific model is created by optimizing the baseline model to predict user-item interactions for a shop using a first training dataset for the shop. Each of the shop-specific models is then tested using a second training dataset for the shop. A loss is calculated for each shop-specific model based on the model's predicted user-item interactions for the applicable second training dataset and the actual user-item interactions in the second training dataset. A global loss is calculated based on each of the shop-specific losses, and the baseline model is updated to minimize the global loss.

More specifically, in one embodiment, the retraining process comprises the following steps:
  (a) identifying a sample batch of shops on the ecommerce platform;
  (b) obtaining a training dataset having a first dataset and a second dataset for each of the shops in the sample batch, wherein, for each shop, the first and second datasets each have item data for items in the shop and user data, including user-item interaction data for items in the shop;
  (c) for each shop in the sample batch, performing the following:
    applying the model to user and item data in the first dataset for the shop to obtain predicted user and item interactions for the first dataset;
    calculating a first shop-specific loss between the predicted user and item interactions and the actual user and item interactions in the first dataset for the shop;
    calculating a first shop-specific parameter adjustment for the model to reduce the first shop-specific loss;
    creating a shop-specific version of the model by applying the first shop-specific parameter adjustment to the model;
    applying the shop-specific version of the model to user and item data in the second dataset for the shop to obtain predicted user and item interactions for the second dataset;
    calculating a second shop-specific loss between the predicted user and item interactions and the actual user and item interactions in the second dataset for the shop; and
  (d) calculating a global loss based on the second shop-specific losses;
  (e) calculating a global parameter adjustment for the model to reduce the global loss;
  (f) creating an updated model by adjusting the parameters of the model using the global parameter adjustment; and
  (g) repeating steps (c)-(f) for a number of iterations, wherein the updated model in a previous iteration becomes the model in the next iteration.

DETAILED DESCRIPTION OF THE PREFERRED EMBODIMENTS

The present disclosure relates to a machine learning-based recommender system and method for predicting user-item interactions on an ecommerce platform that includes shops with different sales volumes. Specifically, the disclosure relates to an improved recommender system with better predictions for small shops while still maintaining prediction accuracy for larger shops. The improvement is achieved by retraining the recommender system to reduce sample selection bias using a meta-learning process. The methods disclosed herein are performed by a computer system ("the system").

We define small/large shops based on the number of sales on the applicable ecommerce platform during a period of time relative to a threshold. Specifically, the terms "small shop" and "smaller shop" refers herein to shops with a sales volume below a certain threshold. Conversely, the terms "large shop," "larger shop" and "largest shops" refers to shops with a sales volume above a certain threshold. The invention is not dependent or limited to any particular threshold or range of thresholds. The threshold that defines small and large shops may depend on the particular ecommerce platform at issue and may be different for each ecommerce platform. However, as example, the threshold may be the median shop sales volume for all shops on the ecommerce platform during a period of time, such as the past 12 months.

Both a training phase and a prediction phase are described below for the recommender system.

1. Training Phase

Figure 1:
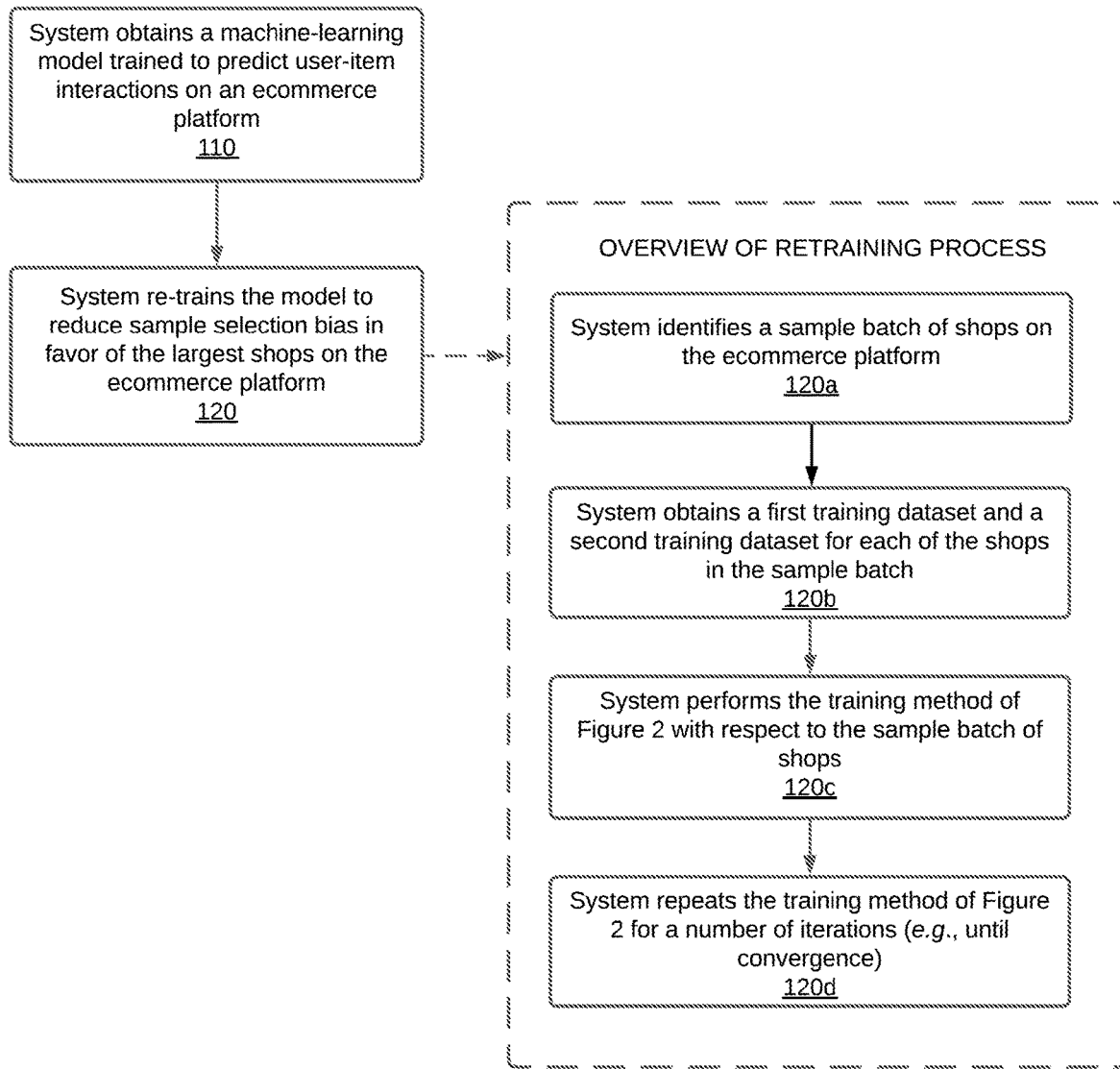
FIG. 1 is a flowchart that illustrates an overview of a training process for a recommendation model according to one embodiment.

FIG. 1 illustrates an overview of the training phase. The system obtains a machine-learning model previously trained to predict user-item interactions on an ecommerce platform (step 110). This model is referred to herein as the baseline model. In one embodiment, the baseline model is trained using item data and user data, including user-item interactions on the ecommerce platforms. The baseline model may be trained using one of a number of known training methods, and the retraining method disclosed herein is not dependent on the way in which the baseline model is initially trained. As discussed above, there will be more training data for items from larger shops than items for smaller shops, and, therefore, the baseline model will be better and making predictions for items from larger shops. This is referred to as sample selection bias.

The system retrains the baseline model to reduce the sample selection bias (step 120). Retraining the model involves identifying a sample batch of shops on the ecommerce platform (step 120*a*). The sample batch is a subset of shops on the platform, and it includes shops in the small size category and shops in the large size category.

The system obtains two training datasets, referred to herein as a first training dataset and a second training dataset, for each of the shops in the sample batch (step 120*b*). Each of the first and second training datasets for a shop includes: (1) item data for items in the shop, and (2) user data, including user-item interaction data. Examples of user-item interaction data include user ratings or purchase history (i.e., whether or not a user has purchased an item).

Figure 2:
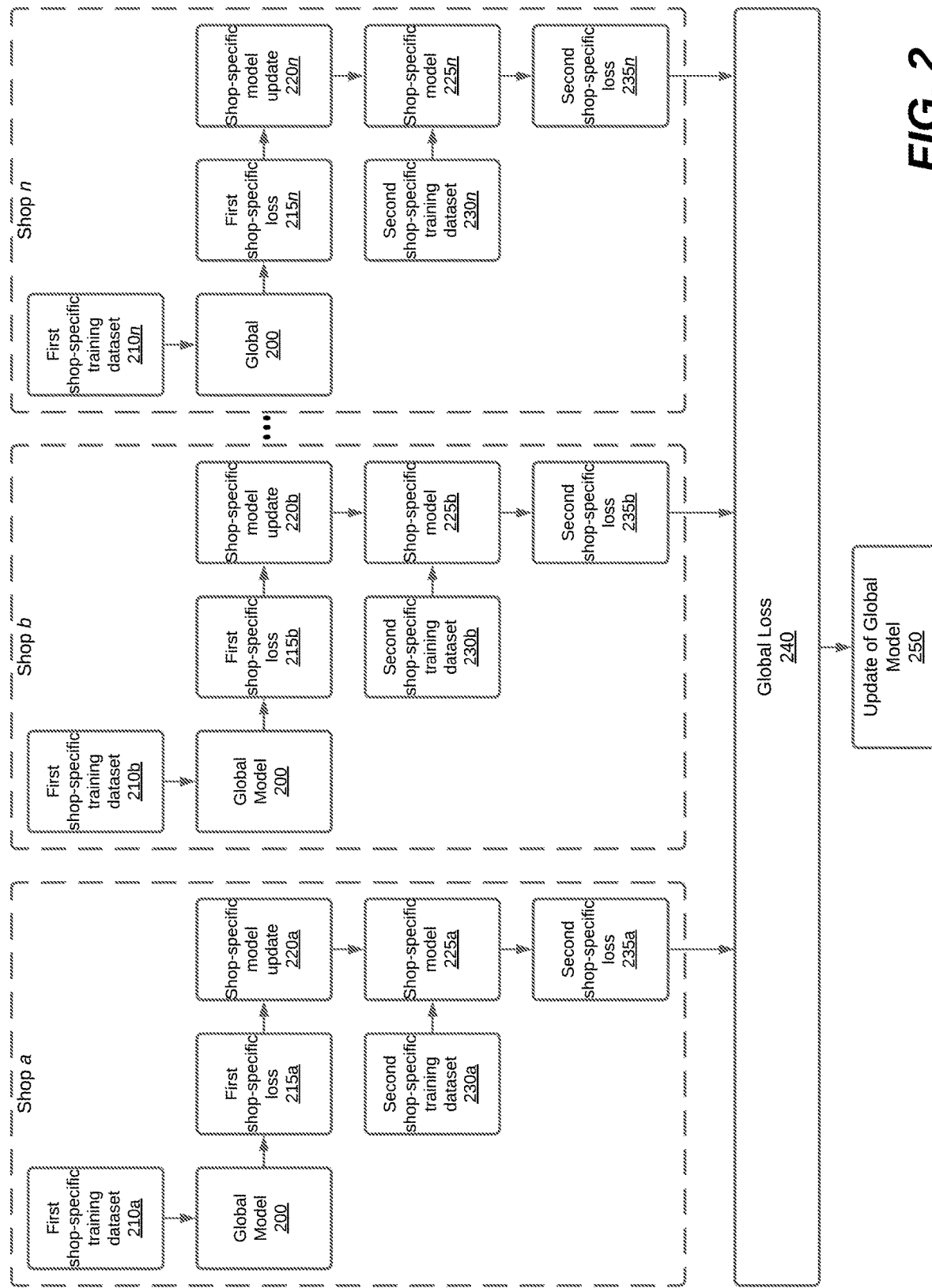
FIG. 2 is a flowchart that illustrates a retraining method for a recommendation model according to one embodiment.

The system performs the retraining method depicted in FIG. 2 with respect to the sample batch of shops and the first and second datasets (step 120*c*). The system repeats the retraining method depicted in FIG. 2 for a number of iterations. This may be a fixed number of iterations, or the system may repeat the retraining method until convergence is achieved (step 120*d*).

1.1 Retraining Method

FIG. 2 illustrates the retraining method. As discussed in the next section, the first part of the method comprises creating a shop-specific version of the model for each of the shops in the sample batch.

1.1.1 Creating Shop-Specific Versions of the Model

The retraining steps described in this section are performed for each shop in the sample batch. The system applies a global model (200) to user and item data in the first training dataset (210) for a shop. The global model generates predicted user and item interactions for the users and items in the shop's first training dataset. The global model is the machine learning model for all shops on the ecommerce platform as opposed to a shop-specific version of the model. During the first iteration of the retraining method, the global model is the baseline model. In subsequent iterations, it is an updated version of the baseline model.

The system calculates a first shop-specific loss (215) for the shop based on the predicted user and item interactions and the actual user and item interactions in the first dataset for the shop. In one embodiment, mean square error is used as the loss function. The system calculates a first shop-specific parameter adjustment (220) for the model to reduce the first shop-specific loss. The system then creates a shop-specific version of the model (225) by applying the first shop-specific parameter adjustment to the model.

In one embodiment, the first training dataset is the same size for each of the shops. This puts small shops on par with larger shops for this phase of the training. In other words, using the same size dataset for each shop in this phase prevents overfitting to larger shops that have more sales data than smaller shops and reduces the sample selection bias inherent in the baseline model.

As discussed below, the next part of the retraining method comprises applying the shop-specific models to the second training datasets, and using the corresponding losses to make a global parameter adjustment.

1.1.2 Using the Shop-Specific Models to Identify Aa Global Parameter Adjustment

For each shop in the sample batch, the system applies the shop-specific version of the model (225) to user and item data in the second dataset (230) for the shop to obtain predicted user and item interactions for the second dataset. In one embodiment, the size of the second data set corresponds to the sales volume for the shop on the ecommerce platform, up to a maximum number (e.g., 100 k transactions). This helps to maintain the prediction accuracy of the model for larger shops.

The system calculates a global loss (240) based on all the second shop-specific losses. In one embodiment, the global loss is calculated as an average of the second shop specific losses. The system then calculates a global parameter adjustment (250) for the model to reduce the global loss. The system creates an updated global model by adjusting the parameters of the model using the global parameter adjustment. In one embodiment, the shop-specific and global parameter adjustments are calculated using gradient descent, and the shop-specific and global parameter adjustments are gradient steps.

The system repeats the retraining method for a number of iterations, wherein the updated global model in the previous iteration becomes the global model in the next iteration.

1.1.3 Mathematical Expression of Retraining Process

Below is a mathematical expression of the retraining method, according to one embodiment.

---

Algorithm 1: Meta-Shop Training

---

Result: θ
Initialization of θ, stepsize α, β, number of local updates K;
while not converge do
    Sample batch of shops $\mathcal{P}$ from $\mathcal{T}_{shop}$;
    for shop p in $\mathcal{P}$ do
        Set $\theta^P = \theta$;
        Sample $\mathcal{D}_S^p$ and $\mathcal{D}_Q^p$ from $\mathcal{D}^p$;
        for k in 1, ..., K do
            $\theta^p \leftarrow \theta^p - \alpha \nabla_{\theta^p} \mathcal{L}(\mathcal{D}_S^p; \theta^p)$;
        end
    end
    global update θ: $\theta \leftarrow \theta - \beta \sum_{p \in \mathcal{P}} \nabla_\theta \mathcal{L}(\mathcal{D}_Q^p; \theta^p)$;
end

---

In the algorithm above:

θ is the recommendation model g's parameter;

$\theta^p$ is the shop-specific recommendation model's parameter;

$D_S^p$ is the first dataset for shop p;

$D_Q^p$ is the second dataset for shop p;

α and β are learning rates;

∇ is a gradient step; and $\mathcal{L}$ is the loss function

Figures 4A, 4B:
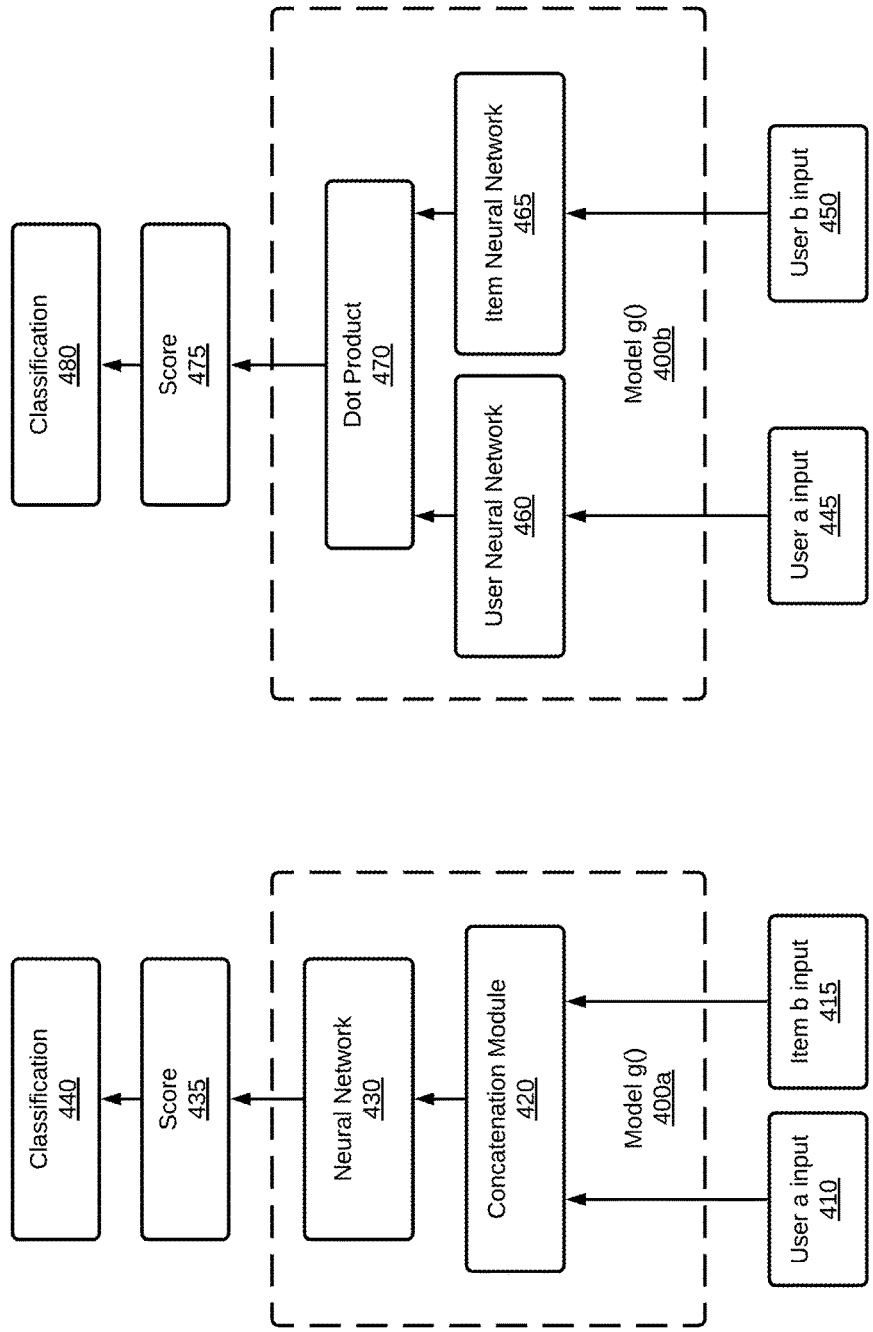
FIGS. 4A and 4B are block diagrams of example machine-learning model architectures for a recommendation system.

FIGS. 4A and 4B, which are discussed in more detail below, illustrate examples of the model with parameter θ.

In one embodiment, the loss function is defined as $\mathcal{L}(D^p, \theta)$=loss (y, ŷ), where y is the actual purchase label (0 for not purchase, 1 for purchase) and $\hat{y}=g_\theta(f_u, f_i)$ is the predicted label, where $f_u, f_i$ are user feature and item feature, which can be trainable one-hot embeddings or pretrained representations.

1.1.4 Experiments Show Improved Performance

The provisional application incorporated by reference herein in the Related Applications section sets forth results of experiments that compare the performance a baseline recommendation model and a recommendation model retrained according to the above method. The results demonstrated that the retrained model had better recommendation performance for small shops as compared to the baseline model without sacrificing performance for larger shops.

2. Prediction Phase

In a prediction phase, the retrained model can be used either to recommend users to shops for targeted advertisements or to recommend items to users on the ecommerce platform.

Figure 3A:
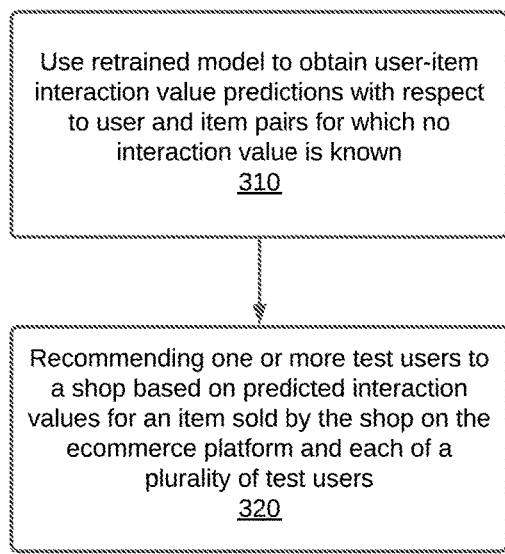
FIGS. 3A and 3B are flowcharts that illustrate prediction phase methods.

FIG. 3A illustrates a method for recommending users to shops in the prediction phase. The system uses the retrained model to obtain user-item interaction value predictions with respect to test user and item pairs for which no interaction value is known (step 310). The system recommends one or more test users to a shop based on predicted interaction values for an item sold by the shop on the ecommerce platform and each of a plurality of test users (step 320). The better performance of the retrained model with respect to smaller shops means better cold start advertisements for small shops.

Figure 3B:
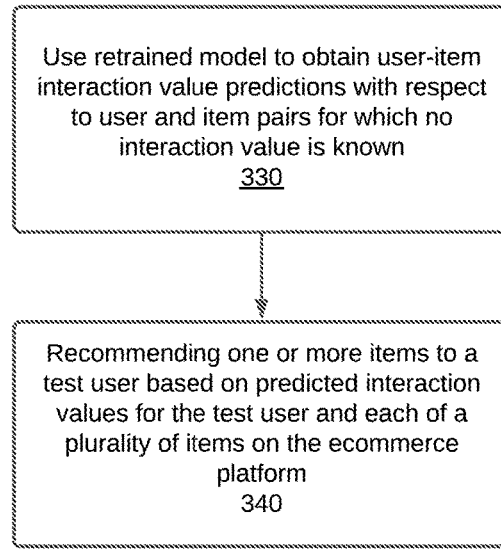

FIG. 3B illustrates a method for recommending one or more items to test users. The system uses the retrained model to obtain user-item interaction value predictions with respect to test user and item pairs for which no interaction value is known (step 330). The system then recommends one or more items to a test user based on predicted interaction values for the test user and each of a plurality of items on the ecommerce platform (step 340).

3. Example Model Architecture

FIGS. 4A and 4B illustrate example architectures for a machine-learning recommendation model. In FIG. 4A, the model 400a includes a concatenation module 420 and a neural network encoder 430. The concatenation model 420 receives user and item input and combines them. The neural network encoder 430 receives the combined user and item data as input and outputs a user-item interaction score (which is in the form of a vector). The user-item interaction score is used by a classification module 440 to predict the user-item interaction.

In FIG. 4B, the model includes a user neural network encoder 460 and an item neural network encoder 465. The user neural network encoder 460 is applied to input user data 445 to generate a user vector representation. Likewise, the item neural network encoder 465 is applied to input item data 450 to obtain an item vector representation. Dot product module 470 takes the dot product of the user and item vectors to create the user-item interaction score, which is used by the classification module 480 to predict the user-item interaction.

In one embodiment, the input user data includes user-item interaction data. It may also include "side information" about a user (e.g., user demographics, such as user age, location, etc.). In one embodiment, the item data includes item "side information" which is information about the item (e.g., product category and subcategories).

4. Example System Architecture

Figure 5:
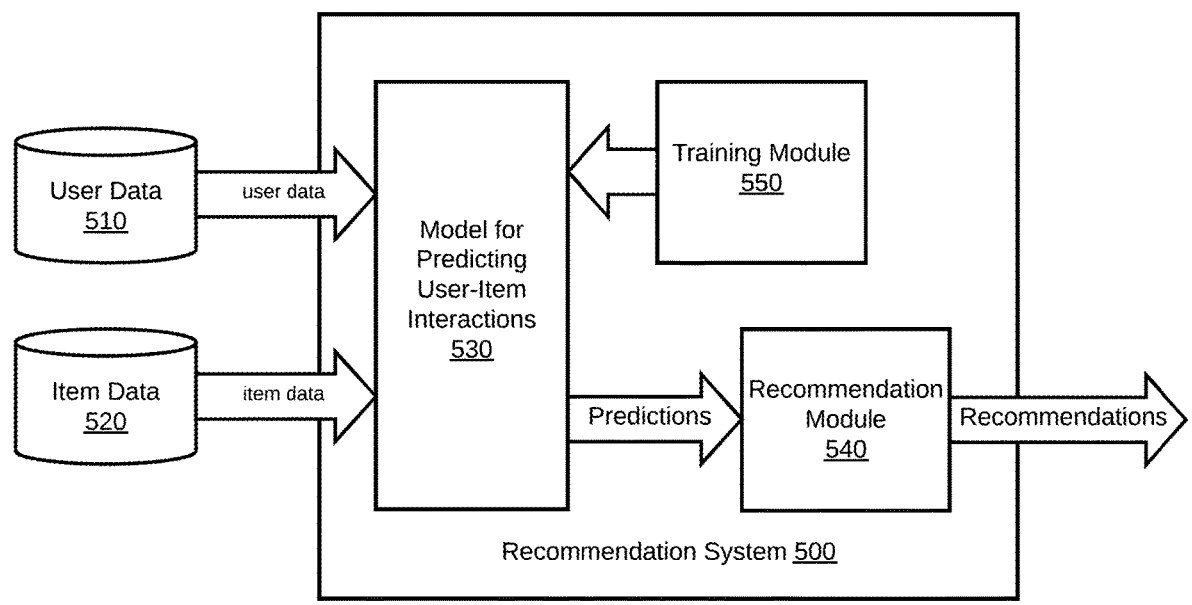
FIG. 5 is a block diagram of an example recommendation system architecture.

FIG. 5 illustrates an example recommendation system software architecture. The system and methods disclosed herein are not necessarily limited to this architecture. The system 500 includes a machine-learning model 530, a training module 550, and a recommendation module 540. The machine-learning model 530 is applied to input user and item data 510, 520 to predict user-item interactions. The model 530 is trained by training module 550 in accordance with the training methods described herein. The recommendation module 540 recommends users to shops or recommends items to users based on the predicted user-item interactions. Those skilled in the art will appreciate that a recommendation system may have other modules that are not relevant to the disclosure herein.

5. General

The methods described with respect to FIGS. 1-5 are embodied in software and performed by a computer system (comprising one or more computing devices) executing the software. A person skilled in the art would understand that a computer system has one or more physical memory units, disks, or other physical, computer-readable storage media for storing software instructions, as well as one or more processors for executing the software instructions. A person skilled in the art would also understand that a computer system may be stand-alone or connected to a computer network as a server.

As will be understood by those familiar with the art, the invention may be embodied in other specific forms without departing from the spirit or essential characteristics thereof. Accordingly, the above disclosure is intended to be illustrative, but not limiting, of the scope of a claimed invention.

The invention claimed is:

1. A machine-learning method, performed by a computer system using a processor, for predicting user-item interaction values on an ecommerce platform that includes products from different shops with different sales volumes, the method comprising:

performing the following with respect to a training phase:
training a machine-learning model to reduce sample selection bias in favor of shops with larger sales volumes by performing the following:
(a) identifying a sample batch of shops on an ecommerce platform;
(b) obtaining a training dataset having a first dataset and a second dataset for each of the shops in the sample batch, wherein, for each shop, the first and second datasets each have item data for items in the shop and user data, including user-item interaction data for items in the shop;
(c) for each shop in the sample batch, performing the following:
applying a baseline model to user and item data in the first dataset for the shop to obtain predicted user and item interactions for the first dataset, wherein the baseline model was previously trained to predict user-item interactions based on user and item data on the ecommerce platform that includes different shops with different sales volumes;
calculating a first shop-specific loss between the predicted user and item interactions and the actual user and item interactions in the first dataset for the shop;
calculating a first shop-specific parameter adjustment for the machine-learning model to reduce the first shop-specific loss;
training the machine-learning model to be specific to the shop by applying the first shop-specific parameter adjustment to the machine-learning model;
applying the machine-learning model to user and item data in the second dataset for the shop to obtain predicted user and item interactions for the second dataset;
calculating a second shop-specific loss between the predicted user and item interactions and the actual user and item interactions in the second dataset for the shop; and
(d) calculating a global loss based on each of the second shop-specific losses;
(e) calculating a global parameter adjustment for the machine-learning model to reduce the global loss;
(f) retraining the machine-learning model by adjusting the parameters of the machine-learning model using the global parameter adjustment; and
(g) repeating steps (c)-(f) for a number of iterations, wherein the retrained machine-learning model in a previous iteration becomes the baseline model in the next iteration;

performing the following with respect to a prediction phase:
using the retrained machine-learning model to obtain user-item interaction value predictions on the ecommerce platform with respect to user and item pairs for which no interaction value is known.

2. The method of claim 1, wherein the shop-specific and global parameter adjustments are calculated using gradient descent and the shop-specific and global parameter adjustments are gradient steps.

3. The method of claim 1, further comprising:
recommending one or more test users to a shop based on predicted interaction values for an item sold by the shop on the ecommerce platform and each of a plurality of test users.

4. The method of claim 1, further comprising:
recommending one or more items to a test user based on predicted interaction values for the test user and each of a plurality of items on the ecommerce platform.

5. The method of claim 1, wherein the first dataset is substantially the same size for each of the shops in the sample batch.

6. The method of claim 5, wherein the second dataset for a shop corresponds to the size of the sales volume of the shop on the ecommerce platform.

7. A method, performed by a computer system using a processor, for training a machine-learning model to predict user-item interaction values on an ecommerce platform that includes products from different shops with different sales volumes, the method comprising:

performing the following with respect to a training phase:
training a machine-learning model to reduce sample selection bias in favor of shops with larger sales volumes by performing the following:
(a) identifying a sample batch of shops on an ecommerce platform;
(b) obtaining a training dataset having a first dataset and a second dataset for each of the shops in the sample batch, wherein, for each shop, the first and second datasets each have item data for items in the shop and user data, including user-item interaction data for items in the shop;
(c) for each shop in the sample batch, performing the following:
applying a baseline model to user and items data in the first dataset for the shop to obtain predicted user and item interactions for the first dataset, wherein the baseline model was previously trained to predict user-item interactions based on user and item data on the ecommerce platform that includes different shops with different sales volumes;
calculating a first shop-specific loss between the predicted user and item interactions and the actual user and item interactions in the first dataset for the shop;
calculating a first shop-specific parameter adjustment for the machine-learning model to reduce the first shop-specific loss;
training the machine-learning model to be specific to the shop by applying the first shop-specific parameter adjustment to the machine-learning model;
applying the machine-learning model to user and item data in the second dataset for the shop to obtain predicted user and item interactions for the second dataset;
calculating a second shop-specific loss between the predicted user and item interactions and the actual user and item interactions in the second dataset for the shop; and
(d) calculating a global loss as a function of each of the second shop-specific losses;

(e) calculating a global parameter adjustment for the machine-learning model to reduce the global loss;
(f) retraining the machine-learning model by adjusting the parameters of the machine-learning model using the global parameter adjustment; and
(g) repeating steps (c)-(f) for a number of iterations, wherein the retrained machine-learning model in a previous iteration becomes the baseline model in the next iteration.

8. The method of claim 7, wherein the shop-specific and global parameter adjustments are calculated using gradient descent and the shop-specific and global parameter adjustments are gradient steps.

9. The method of claim 7, wherein the first dataset is substantially the same size for each of the shops in the sample batch.

10. The method of claim 9, wherein the second dataset size for a shop corresponds to the size of the sales volume of the shop on the ecommerce platform.

11. A system for predicting user-item interaction values on an ecommerce platform that includes products from different shops with different sales volumes, the system comprising:
a processor configured to execute instructions programmed using a set of machine codes;
one or more memory units coupled to the processor; and
a machine-learning model, stored in the one or more memory units of the system, that takes a user input and an item input and outputs a user-interaction score corresponding to a predicted user-interaction value for users and items on the ecommerce platform, wherein the machine-learning model includes computational instructions implemented in the machine code for generating the output, and wherein the machine-learning model is trained according to a method that comprises the following:
(a) identifying a sample batch of shops on the ecommerce platform;
(b) obtaining a training dataset having a first dataset and a second dataset for each of the shops in the sample batch, wherein, for each shop, the first and second datasets each have item data for items in the shop and user data, including user-item interaction data for items in the shop;
(c) for each shop in the sample batch, performing the following:
applying the machine-learning model to user and items data in the first dataset for the shop to obtain predicted user and item interactions for the first dataset;
calculating a first shop-specific loss between the predicted user and item interactions and the actual user and item interactions in the first dataset for the shop;
calculating a first shop-specific parameter adjustment for the machine-learning model to reduce the first shop-specific loss;
training the machine-learning model to be specific to the shop by applying the first shop-specific parameter adjustment to the machine-learning model;
applying the machine-learning model to user and item data in the second dataset for the shop to obtain predicted user and item interactions for the second dataset;
calculating a second shop-specific loss between the predicted user and item interactions and the actual user and item interactions in the second dataset for the shop; and (d) calculating a global loss based on each of the second shop-specific losses;
(e) calculating a global parameter adjustment for the machine-learning model to reduce the global loss;
(f) retraining the machine-learning model by adjusting the parameters of the machine-learning model using the global parameter adjustment; and
(g) repeating steps (c)-(f) for a number of iterations, wherein the retrained machine-learning model in a previous iteration becomes the machine-learning model in the next iteration.

12. The system of claim 11, wherein the machine-learning model includes the following:
a concatenation module for receiving the user and item input and concatenating the user and item input; and
a neural network encoder that receives the concatenated user and item input and outputs the user-item interaction score.

13. The system of claim 11, wherein the machine-learning model includes the following:
an item neural network encoder for receiving the item data and outputting an item feature representation; and
a user neural network encoder for receiving the user data and outputting a user feature representation;
wherein the user-item interaction score is generated by taking the dot product of the user and item feature representations.

14. The system of claim 11, wherein the shop-specific and global parameter adjustments are calculated using gradient descent and the shop-specific and global parameter adjustments are gradient steps.

15. The system of claim 11, wherein the first dataset is substantially the same size for each of the shops in the sample batch.

16. The system of claim 15, wherein the second dataset for a shop corresponds to the size of the sales volume of the shop on the ecommerce platform.

17. A non-transitory computer-readable medium comprising a computer program, that, when executed by a computer system using a processor, enables the computer system to perform the following method for predicting user-item interaction values on an ecommerce platform that includes products from different shops with different sales volumes, the method comprising:
performing the following with respect to a training phase:
training a machine-learning model to reduce sample selection bias in favor of shops with larger sales volumes by performing the following:
(a) identifying a sample batch of shops on an ecommerce platform;
(b) obtaining a training dataset having a first dataset and a second dataset for each of the shops in the sample batch, wherein, for each shop, the first and second datasets each have item data for items in the shop and user data, including user-item interaction data for items in the shop;
(c) for each shop in the sample batch, performing the following:
applying a baseline model to user and item data in the first dataset for the shop to obtain predicted user and item interactions for the first dataset, wherein the baseline model was previously trained to predict user-item interactions based on user and item data on the ecommerce platform that includes different shops with different sales volumes;

calculating a first shop-specific loss between the predicted user and item interactions and the actual user and item interactions in the first dataset for the shop;

calculating a first shop-specific parameter adjustment for the machine-learning model to reduce the first shop-specific loss;

training the machine-learning model to be specific to the shop by applying the first shop-specific parameter adjustment to the machine-learning model;

applying the machine-learning model to user and item data in the second dataset for the shop to obtain predicted user and item interactions for the second dataset;

calculating a second shop-specific loss between the predicted user and item interactions and the actual user and item interactions in the second dataset for the shop; and (d) calculating a global loss based on each of the second shop-specific losses;

(e) calculating a global parameter adjustment for the machine-learning model to reduce the global loss;

(f) retraining the machine-learning model by adjusting the parameters of the machine-learning model using the global parameter adjustment; and (g) repeating steps (c)-(f) for a number of iterations, wherein the retrained machine-learning model in a previous iteration becomes the baseline model in the next iteration;

performing the following with respect to a prediction phase:

using the retrained machine-learning model to obtain user-item interaction value predictions on the ecommerce platform with respect to user and item pairs for which no interaction value is known.

18. The non-transitory computer-readable medium of claim 17, further comprising:

recommending one or more test users to a shop based on predicted interaction values for an item sold by the shop on the ecommerce platform and each of a plurality of test users.

19. The non-transitory computer-readable medium of claim 17, further comprising:

recommending one or more items to a test user based on predicted interaction values for the test user and each of a plurality of items on the ecommerce platform.

20. The non-transitory computer-readable medium of claim 17, wherein the first dataset is substantially the same size for each of the shops in the sample batch.

* * * * *